March 1, 1955 J. DMOHOWSKI 2,703,170
CHAIN FLIGHT AND THE LIKE
Filed June 24, 1954
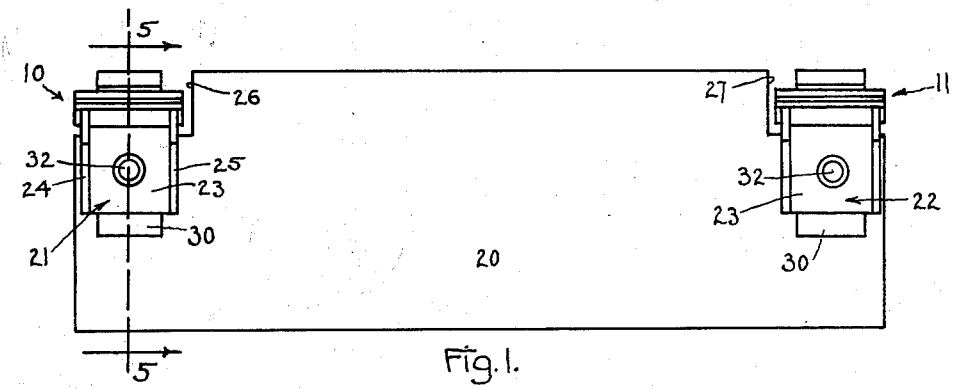
Fig. 1.
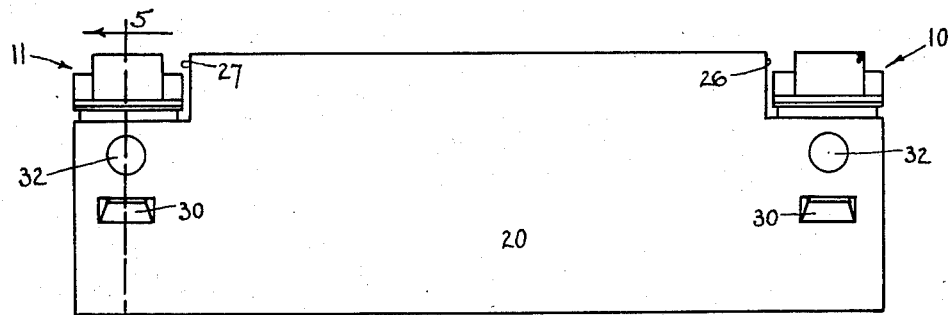
Fig. 2.
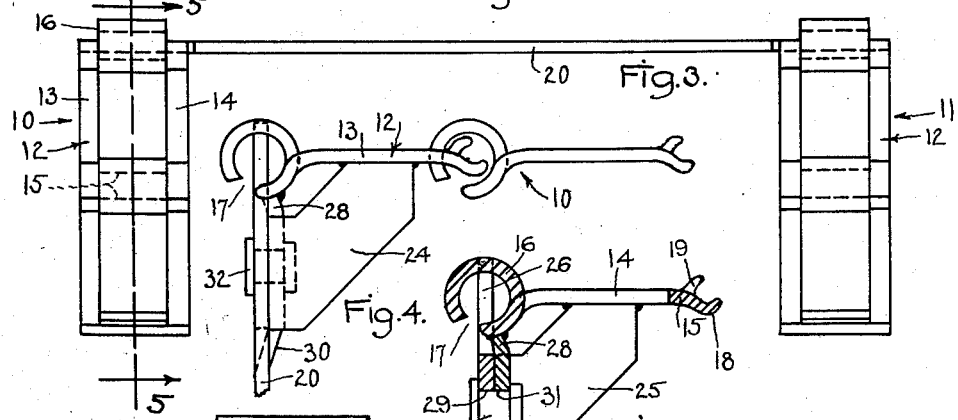
Fig. 3.
Fig. 4.
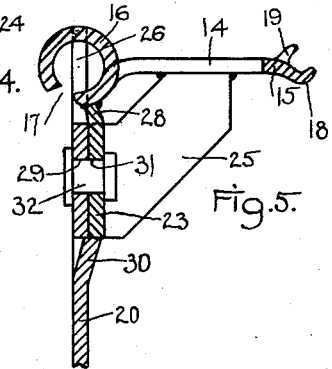
Fig. 5.
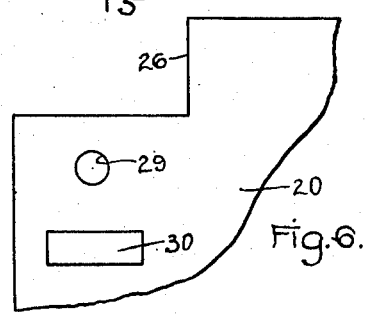
Fig. 6.
Inventor:
John Dmohowski,
by

United States Patent Office 2,703,170
Patented Mar. 1, 1955

2,703,170

CHAIN FLIGHT AND THE LIKE

John Dmohowski, Chicago, Ill., assignor to Chains, Inc., Dolton, Ill., a corporation of Illinois Application June 24, 1954, Serial No. 439,052

4 Claims. (Cl. 198—175)

This invention relates to improvements in chain flights, and the like. By this term I mean, those chain members of a chain carrier which are provided with "flights," which flights serve to move material along the path of movement executed by the chain carrier. Chain carriers provided with such flights are widely used in many industrial operations, and for the movement of many classes of material.

The present invention refers specifically to that type of chain flight construction in which the flight is connected to one of the chain links, and depends below the plane or line of travel of the chain links themselves. In such a case the flight generally travels along a suitable channel or other path defining element, the chain links being located and travelling at an elevation higher than the floor of such channel. Under these conditions of operation it is evident that a dragging force is developed against the face of the flight, and since such face is below the elevation of the link to which the flight is connected it follows that a torque is developed tending to rock the flight and the link to which it is connected about a horizontal axis extending transverse to the line of travel. It is also evident that this torque force may be of large amount, depending on the size of the flight, its width and vertical dimension which are in engagement with the material being moved, the kind of such material, its specific gravity, condition of moisture content and other factors. In any case such torque will tend to rock the link to which the flight is connected either up or down depending on the direction of travel, and depending on which face of the flight is the active face thereof. It is thus evident that means must be provided for securing the flight very firmly to the link.

A further condition of operation which must be provided for is as follows:

In a well known and widely used construction of such conveyors use is made of a bracket to which the flight is connected, and which bracket also is secured to and in effect comprises a portion of that link of the chain to which the flight is connected. In other words, this type of construction is one in which such bracket comprises in effect a portion of the flight link, and the flight itself is then connected to such bracket. In making up such a chain construction as the foregoing it is evident that the attachment of the bracket to the flight must be of such a nature that the link itself will also be properly related to the flight in order to ensure good running of the assembled chain with its flights. This requirement will be better understood from the following further explanation:

A large proportion of such flight chain conveyors are formed with two parallel chains travelling along parallel paths, and each flight is then pendant from opposite links of both of the chains, and is connected to both of such links. Thus the flight spans the space between the two chains, and in fact usually extends somewhat beyond each chain so that the effective width of the flight is greater than the center to center spacing of the two chains. But it is especially noted that when such a construction of the conveyor is provided the two brackets must be so connected to the common flight that their connections to the links of the two chains will be exactly positioned both as to elevation on the flight, and as to verticality that the chain links will not be twisted in either direction from the common plane which includes the two chains. This requirement will be better understood when it is mentioned that such chain conveyors usually include the flight links to which the flights are connected, as well as a number of "running" links of each chain between the flight links thereof. That is, it is customary to separate the flights along the conveyor by a distance equal to two or three or several links, so that such running links do not carry flights, but serve to connect together the flight links themselves. Now in order to ensure smooth running of the chains it is evident that the flight links must be so connected to their flights that they will lie accurately within the plane which is also common to these running links. This requires that the brackets be so connected and secured to their flights that said brackets may not rock or otherwise move with respect to the flights, as any such rocking movement will result in lateral displacements of the links which are connected to the flights, and will also result in twisting the flight links out of the plane of travel in which they should remain. Any rocking of the brackets to carry their upper portions outwardly from each other will result in a widening of the distance between their links, so that the amount of chain separation at the location of such rocked bracket flight will be greater than intended. Of course a contrary effect will be produced by a bracket rock which brings the upper portions of the brackets closer together than intended or specified.

When such a bracket construction is used for attachment of the flight link to the flight itself, such bracket is generally provided of U-shape, and the bracket is then set against the face of the flight with its connecting portion in facial contact with the flight and with the bracket arms extending from the face of the flight in the direction of conveyor travel. Various means have heretofore been provided for connecting these brackets to the flights, generally including riveted connections, with the rivet shanks passing through the flight thickness and through the connecting portion of the bracket. When such a simple riveted construction is used it is evident that the only restraining force produced to hold the bracket against rock with respect to the flight is that frictional force developed by the tension exerted by the rivet itself. When such a riveted construction is used it is therefore necessary to use a high degree of care in the assembling and riveting of the brackets to the flights, to ensure that strong tension effects are produced. However, it is also evident that even if and when the necessary tension effects are produced in the rivets, any elongation of the rivets during service operation, or any slight wear on the proximate surfaces of the flight and the bracket will result in a loosening of the brackets with respect to the flight, so that rock may occur.

It has been proposed to use expedients to retain the rivets securely in place so as to avoid the foregoing bracket rock. However, all such expedients have failed, as far as I am aware, since the rocking or twisting torques which are developed between the brackets and the flights are large under some operating conditions, so that it has been found impractical to produce simple riveted connections which will retain the brackets against rock over an operating interval of practical duration.

It is further pointed out that when the holding or retaining element comprises only a rivet great care must be exercised in placing and holding the bracket in proper position against the surface of the flight during the riveting operation, as otherwise the bracket will not be correctly secured to the flight, and it will be found that incorrect angular relation of the bracket and the flight has been produced. This needed care in assembly has thus resulted in higher cost of the finished units, in addition to the other objectionable features to which I have referred.

The prime object of the present invention is to provide a construction of the flight and the bracket such that the foregoing objectionable features are completely eliminated or greatly reduced. To this end my present improvements include the following:

The flights are formed of sheet or plate metal die cut and formed according to well understood operations. However, in these operations I include means to punch the rivet hole through the flight plate, and also to offset or emboss an abutment against which the edge of the bracket must engage when correct assembly is made, both the perforating of the rivet hole and the formation of such abutment being done at one and the same forming operation; so that the rivet hole must of necessity be correctly located with respect to the abutment, and so that such locating of the rivet hole and the abutment with respect to each other must of necessity conform to a spacing specification which is always the same within accepted tolerances. I then also form the bracket from sheet or plate metal by suitable forming operations, including the punching of the rivet hole through the base of such bracket. Since these operations can be performed with the location of the rivet hole of the bracket at exact spacing from the bracket edge which shall engage the abutment formed on the flight, it is known that when the bracket is assembled to the surface of the flight with the rivet holes of both the bracket and the flight in registry, the edge portion of the bracket must of necessity be in close engagement with the abutment of the flight. Then, when the rivet has been passed through the holes of both the bracket and the flight, and riveted in place, the bracket edge will also be firmly in engagement with the abutment. Thus the accurate assembly of the parts is ensured, and both of the parts—the bracket and the flight—may be produced according to well understood and accepted shop practices, at low cost, and with great accuracy and uniformity; and at the same time a construction is produced in which the rocking of the bracket with respect to the flight does not depend on the tightness of the rivet, nor on frictional engagement of the bracket with the surface of the flight.

Other objects and uses of the invention will appear from a detailed description of the same, which consists in the features of construction and combinations of parts hereinafter described and claimed.

In the drawing:

Figure 1 shows a face view of a flight of a chain conveyor construction embodying the features of my present invention, showing the two brackets mounted to such flight, and also showing the near ends of the two chain links which are connected to such brackets;

Figure 2 shows a face view of the same flight as is shown in Figure 1, but looking at the opposite face of the flight from that of Figure 1;

Figure 3 shows a plan view of the flight of Figures 1 and 2, showing the chain links which are connected to the flight by their respective brackets; and this figure also shows a running link linked with each of such flight links in the intended manner of inter-linkage;

Figure 4 shows a side elevation corresponding to Figure 1, looking at the left-hand edge of the flight and link construction shown in Figure 1, and the lower portion of the flight is cut off in Figure 4 for the purpose of reducing the space occupied by said figure;

Figure 5 shows a cross-section taken on the line 5—5 of Figures 1, 2 and 3, looking in the directions of the arrows; and this figure shows in more detail than other figures the locking relationship between the bracket, the rivet, and the flight and the flight abutment; and Figure 6 shows a face view of a fragment of one end of the flight, showing the relation between the rivet hole and the abutment at that end of the flight; and this figure shows how the rivet hole and the abutment must always come into exact correct relationship to ensure correct placement and great holding power of the bracket on the flight, especially the retention of the flight and bracket in correct angular position.

In the foregoing figures, numbers 1, 2 and 3 are on the same scale, and Figures 4, 5 and 6 are on enlarged scale.

In the figures the two chains are designated as 10 and 11, respectively. They comprise the rectangular links 12, each of which is formed from a section of metal strap by well known forming operations. Each link includes the two side arms 13 and 14, connected at one end by the cross bar 15. The arms of such link are connected at the other link end by the cross piece 16 which is formed into circular form, but the free end of such so formed portion is not brought into engagement with the cross connection between the arms 13 and 14, thus leaving the narrow slotted opening 17 as shown, for example, in Figure 4. The metal of such circular portion is that metal cut out or away from the blank between the arms 13 and 14 as will be readily understood from comparison of Figures 3 and 4. These links may be readily connected together into chain form by the proper use of the slotted openings 17. It is noted that the cross bar 15 is formed with the downwardly extended edge portion 18 and the upwardly extended edge portion 19 which is curled around over the portion 18, so that together these two edge portions produce a rounded cross-section cross bar which seats into the circular portion 16 of the adjacent link when the several links are connected together.

One of the flights is shown at 20 in the various figures. This flight is conveniently formed from a section of metal strap or plate by suitable dies, and the form of flight herein disclosed may be thus produced by very simple die forming operations. The length of the flight is at least as great as the spacing between the two chain runs 10 and 11, and preferably slightly greater than such spacing, as shown in Figures 1, 2 and 3. To the end portions of one face of the flight there are connected the bracket elements 21 and 22, with which the present application is particularly concerned. Each of these brackets is formed from metal plate or sheet formed into U-shape, including the base or cross element 23 and the two side flanges 24 and 25. The flight plate is cut away at the upper corners as shown at 26 and 27 to accommodate the two chain reaches passing the flight in question. Each bracket is set against the face of the flight beneath one of these cut-away flight portions; and the bracket side flanges are so formed as to reach upwardly to position proper to engage the chain link at that location. The details of such engagement are shown in Figures 4 and 5 to which reference is now made:

The base element 23 of the bracket is provided with the upper edge extension 28 which extends just high enough so as to engage the lower portion of the circular portion 16 of the link above such bracket when the lower faces of the two side arms 13 and 14 of such link rest on the upper edges of the bracket flanges 24 and 25. Then the circular portion is welded to such edge extension 28, and the link side arms 13 and 14 are welded to the bracket flanges 24 and 25, thus producing a unitary and extremely strong unit comprising the bracket and the link element. Thus these parts are permanently secured together and act as a unit.

It remains to show how the bracket portion of this unit is connected to the flight at the proper location, and in conformity with the features which I have already discussed. The flight plate is formed at each end portion, and in proper location to receive the corresponding bracket-link element, with the through hole 29 and with the offset or embossed abutment 30. This abutment extends out from the face of that side of the flight against which the bracket is to be set and secured. Also, in the form shown the lower edge of the cross element 23 of the bracket is straight and normal to the planes of the bracket flanges 24 and 25, and the abutment is formed with its upper bracket engaging edge parallel to the length of the flight. The base element 23 of the bracket is provided with a through hole 31 located above the lower edge of such base element the same separation as the separation of the hole 29 of the flight from the upper edge of the abutment of such flight. Accordingly, when the bracket is set against the face of the flight with the lower edge of the base element in solid engagement with the top edge of the abutment, the two holes 29 and 31 may be brought into register by correctly locating the bracket on the upper edge of the abutment. Then the rivet 32 may be set through the registered holes 29 and 31, and properly riveted in place. Having done this the bracket will be held face to face against the surface of the flight; but rotation of the bracket about the rivet as a pivot will be prevented by the engagement of the lower edge of the base element 23 of the bracket with the upper edge of the abutment.

It is now seen that the forming operations of the flight themselves produce the relationship between the rivet holes and the abutments which, in conjunction with the forming of the holes in the base elements 23 of the bracket members, ensure all of the desired results referred to earlier herein.

Attention is called to the fact that the rivet holes of the brackets are located on the central or medial lines of such brackets, and are also all located at the same distance from the lower or abutment engaging edges of the brackets. Therefore the brackets are of uniform specifications, and are interchangeable, and each bracket may be used for either a right-hand or a left-hand position. Also, since the holes in the flight plate are properly located for such standardized brackets, it follows that when any bracket is set against the abutment at either end of the flight plate the rivet holes of such abutment and of such flight plate location will register and at the same time be correct for the lateral spacing of the chain link to which such bracket is connected. Thus I have provided a fully standardized construction, and one in which the parts are fully interchangeable.

I claim:

1. In a chain flight conveyor, the combination of a pair of parallel link chains each composed of a series of rectangular link elements, link elements of both chains lying opposite to each other on a line normal to the length of the conveyor, each link element including a pair of parallel side arms and end cross members connecting the side arms aforesaid, and pivotal connections between the proximate end cross members of successive link elements, a chain flight member below oppositely disposed link elements of both chains, said flight member comprising a metal plate lying substantially within a plane normal to the length of the conveyor, a U-shaped bracket below and corresponding to each of said oppositely disposed link elements and comprising a pair of side flanges and a base element extending between and connected to said side flanges, the base elements of both brackets being in facial engagement with one face of the plate of the flight member, the side flanges of each bracket extending from the base element of such bracket in the direction of the length of the chain and having their top portions registered with and connected to the parallel side arms of the corresponding chain link element, each bracket base element having a substantially straight abutment engaging surface normal to the face of the flight member at the location of such bracket, together with means to position each U-shaped bracket with respect to the plate of the flight member and to lock such bracket to the flight member plate with the corresponding chain link elements lying on said line which is normal to the length of the conveyor, each of said positioning and locking means comprising an abutment lug on the flight member plate and having a substantially straight abutment surface at the location of the proximate abutment engaging surface of the corresponding bracket, together with a rivet extended through the base element of the bracket and through the flight member plate.

2. Means as defined in claim 1, wherein the abutment lugs of the flight member plate comprise offset portions of the metal plate of the flight member.

3. Means as defined in claim 1, wherein the abutment engaging surfaces of the brackets extend in direction substantially parallel to the length of the flight member, and wherein the abutment surfaces of the abutments of the flight extend in direction substantially parallel to the length of the flight member.

4. Means as defined in claim 3, wherein the abutment lugs of the flight member comprise offset portions of the metal plate of the flight member.

References Cited in the file of this patent

UNITED STATES PATENTS

| | | |
|---|---|---|
| 1,335,696 | Patten et al. | Mar. 30, 1920 |
| 1,638,267 | Morehead et al. | Aug. 9, 1927 |
| 1,758,484 | Van Slyke | May 13, 1930 |